(12) United States Patent
Hetzler et al.

(10) Patent No.: US 7,297,391 B2
(45) Date of Patent: Nov. 20, 2007

(54) DRAW RESONANCE RESISTANT MULTILAYER FILMS

(75) Inventors: Kevin G. Hetzler, Sparta, NJ (US); Viktor Skatchkov, Bloomingdale, NJ (US); Gordon Vincent Sharps, Jr., Merrimack, NH (US)

(73) Assignee: Saint-Gobain Performance Plastics Corporation, Wayne, NJ (US)

( * ) Notice: Subject to any disclaimer, the term of this patent is extended or adjusted under 35 U.S.C. 154(b) by 314 days.

(21) Appl. No.: 10/901,456

(22) Filed: Jul. 28, 2004

(65) Prior Publication Data

US 2005/0186432 A1    Aug. 25, 2005

Related U.S. Application Data

(63) Continuation-in-part of application No. 10/783,946, filed on Feb. 20, 2004, now abandoned.

(51) Int. Cl.
*B32B 27/08*    (2006.01)
*B32B 27/30*    (2006.01)

(52) U.S. Cl. .................. 428/212; 428/213; 428/421; 428/522

(58) Field of Classification Search ............... 525/199; 428/212, 213, 421, 422, 522
See application file for complete search history.

(56) References Cited

U.S. PATENT DOCUMENTS

| | | | |
|---|---|---|---|
| 3,253,060 A | 5/1966 | Koblitz et al. | |
| 4,076,929 A * | 2/1978 | Dohany | 526/255 |
| 4,317,860 A | 3/1982 | Strassel | |
| 4,677,017 A | 6/1987 | DeAntonis et al. | |
| 4,743,327 A | 5/1988 | DeHaan et al. | |
| 4,859,379 A | 8/1989 | Chiang | |
| 4,871,506 A | 10/1989 | Moulies et al. | |
| 4,879,345 A | 11/1989 | Connelly et al. | |
| 4,948,641 A * | 8/1990 | Shantz et al. | 428/35.7 |
| 5,143,761 A | 9/1992 | Chiotis et al. | |
| 5,242,976 A | 9/1993 | Strassel et al. | |
| 5,256,472 A | 10/1993 | Moriya et al. | |
| 5,284,710 A | 2/1994 | Hartley et al. | |
| 5,322,899 A | 6/1994 | Grunewalder et al. | |
| 5,395,471 A | 3/1995 | Obijeski et al. | |
| 5,589,028 A | 12/1996 | Robinson et al. | |
| 5,756,230 A | 5/1998 | Gao et al. | |
| 6,114,441 A | 9/2000 | Spohn et al. | |
| 6,117,508 A | 9/2000 | Parsonage et al. | |

(Continued)

OTHER PUBLICATIONS

C. Pattamaprom, et al., "Analysis of Extensional Viscosity Techniques for the Characterization of Fluorpopolymers", ANTEC 2002.

(Continued)

*Primary Examiner*—Ramsey Zacharia
(74) *Attorney, Agent, or Firm*—Larson Newman Abel Polansky & White, LLP; Chi Suk Kim

(57) ABSTRACT

Aspects of the invention are found in a multilayer film comprising a first polymer layer and a second polymer layer. The first polymer layer comprises a blend of a first fluoropolymer having a first average molecular weight and a second fluoropolymer having a second average molecular weight. The first average molecular weight is greater than the second average molecular weight.

43 Claims, 3 Drawing Sheets

U.S. PATENT DOCUMENTS

| | | |
|---|---|---|
| 6,127,478 A | 10/2000 | Spohn |
| 6,136,437 A | 10/2000 | Reither |
| 6,143,415 A | 11/2000 | Lorek et al. |
| 6,284,335 B1 | 9/2001 | Spohn |
| 6,306,503 B1 | 10/2001 | Tsai |
| 6,436,495 B1 | 8/2002 | Tsukamoto et al. |
| 6,436,533 B1 | 8/2002 | Heffner et al. |
| 6,444,311 B1 | 9/2002 | Friedman et al. |
| 6,482,522 B1 | 11/2002 | Parsonage et al. |
| 6,524,671 B1 | 2/2003 | Spohn |
| 6,524,686 B2 | 2/2003 | Strassel |
| 6,576,342 B1 | 6/2003 | Cerf et al. |
| 6,583,222 B1 | 6/2003 | Chaudbary et al. |
| 6,593,005 B2 | 7/2003 | Tau et al. |
| 6,630,047 B2 | 10/2003 | Jing et al. |
| 6,635,714 B1 | 10/2003 | Wood et al. |
| 6,667,101 B2 | 12/2003 | Silagy et al. |
| 6,685,793 B2 | 2/2004 | Jing |
| 6,699,798 B2 | 3/2004 | Rockford |
| 6,706,351 B2 | 3/2004 | Abusleme et al. |
| 6,743,865 B2 | 6/2004 | Mekhilef et al. |
| 6,753,087 B2 | 6/2004 | Jing et al. |
| 6,759,129 B2 | 7/2004 | Fukushi |
| 6,767,948 B1 | 7/2004 | Jing |
| 6,780,935 B2 | 8/2004 | Hedhli et al. |
| 6,790,912 B2 | 9/2004 | Blong |
| 6,797,781 B2 | 9/2004 | Lee et al. |
| 6,811,859 B2 | 11/2004 | Bonnet et al. |
| 6,833,043 B1 | 12/2004 | Parsonage et al. |
| 6,838,520 B2 | 1/2005 | Etherton |
| 6,849,314 B2 | 2/2005 | Jing et al. |
| 6,855,787 B2 | 2/2005 | Funaki et al. |
| 2001/0051256 A1 | 12/2001 | Silagy et al. |
| 2002/0040118 A1* | 4/2002 | DeSimone et al. .......... 526/227 |
| 2002/0061398 A1 | 5/2002 | Heffner et al. |
| 2002/0068175 A1 | 6/2002 | Strassel |
| 2002/0074691 A1 | 6/2002 | Mortellite et al. |
| 2002/0150763 A1 | 10/2002 | Silagy et al. |
| 2003/0035971 A1 | 2/2003 | Bussi et al. |
| 2003/0041952 A1 | 3/2003 | Mortellite et al. |
| 2003/0104219 A1 | 6/2003 | Hare et al. |
| 2003/0114595 A1 | 6/2003 | Van Dun et al. |
| 2003/0145938 A1 | 8/2003 | Mortellite et al. |
| 2003/0198769 A1 | 10/2003 | Jing et al. |
| 2004/0023037 A1 | 2/2004 | Baumert et al. |
| 2004/0054050 A1 | 3/2004 | Pascal et al. |
| 2004/0086721 A1 | 5/2004 | Bonnet et al. |
| 2004/0137252 A1 | 7/2004 | Bonnet et al. |

OTHER PUBLICATIONS

M.H. Wagner, "Rheotens-Mastercurves and Drawability of Polymer Melts", Polymer Engineering and Science, mid-Apr. 1996, vol. 36, No. 7., pp. 925-935.

J.S. Lee, et al., "Meltspinning Dynamic of Phan-Thien Tanner Fluids", Korea-Australia Rheology Journal, Jun. 2000, vol. 12, No. 2, pp. 119-124.

T. Matsumoto, et al., "Draw Resonance Involving Rheological Transitions", Polymer Engineering and Science, May 1978, vol. 18, No. 7, pp. 564-571.

J.C. Hyun, "Theory of Draw Resonance", AICHE Journal, May 1978, vol. 25, No. 3, pp. 418-422.

J.C. Hyun, "Part II. Power Law and Maxwell Fluids", AICHE Journal, May 1978, vol. 24, No. 3, pp. 423-426.

S. Goyal, "The Influence of Polymer Structure on Melt Strength Behavior of PE Resins", Plastics Engineering, Feb. 1995, pp. 25-28.

E. M. Phillips, et al., "High Performance Polypropylene Extrusion Coating Resins", Journal of Coated Fabrics, vol. 19, Jan. 1990, pp. 155-168.

K.K. Dohrer, et al., "Resistance to Draw Resonance of Linear Low Density Polyethylene Through Improved Resin Design", ANTEC '89, May 1-3, pp. 177-183, 1989.

P.J. Lucchesi, et al., "Reducing Draw Resonance in LLDPE Film Resins", Plastics Engineering, May 1985, pp. 87-90.

A. Ghijsels, et al., "Draw Resonance Studies on Polypropylene Melts", International Congress on Rheology, 8th, 1980, Ed. by G. Astarita, pp. 15-24.

J. Flanagan, "Better die Design and Equipment Enhance the Cast Film Process", Modern Plastics International, Feb. 1993, pp. 35-37.

E.H. Roberts, et al., "Draw Resonance Reduction in Melt Embossing and Extrusion Coating Resins", Advances in Polymer Technology, vol. 6, No. 1, pp. 65-71 (1986).

H. Kometani, et al., "Development of Wide and High-Speed Nonoriented Film Production Lines", Mitsubishi Heavy Industries, Ltd., Technical Review, vol. 38, No. 1, Feb. 2001.

* cited by examiner

← 300

| 302 |
| 304 |
| 306 |
| 308 |
| 310 |

FIG. 3

DRAW RESONANCE RESISTANT MULTILAYER FILMS

CROSS-REFERENCE TO RELATED APPLICATION(S)

The present application is a continuation-in-part and claims priority from U.S. Utility patent application Ser. No. 10/783,946, filed Feb. 20, 2004, now abandoned entitled "DRAW RESONANT RESISTANT MULTILAYER FILMS," naming inventors Kevin G. Hetzler, Viktor Skatchkov, and Xixian Zhou, which application is incorporated by reference herein in its entirety.

TECHNICAL FIELD OF THE DISCLOSURE

This disclosure, in general, relates to draw resonant resistant multilayer films, methods for manufacturing same and articles including same.

BACKGROUND

Increasingly, manufacturers are turning to polymers to create surfaces that are resistant to chemical and environmental damage. For example, fluorinated polymers exhibit a resistance to damage caused by exposure to chemicals, such as methyl ethyl ketone (MEK), a resistance to stains, and a resistance to damage caused by exposure to environmental conditions. Such polymers have been used in applications such as airplane and train cargo hold liners, vinyl siding surface treatments, and photovoltaic protective coverings.

However, processing of such films for use in these applications is difficult. Line speed in production is often limited by the appearance of draw resonance at relatively low line speeds, such as below 50 feet per minute. These processing limitations increase costs and reduce the availability of these beneficial films. As such, robust multilayer films having preferred mechanical and processing properties are generally desirable in the art.

SUMMARY

In one particular embodiment, the disclosure is directed to a multilayer film comprising a first polymer layer and a second polymer layer. The first polymer layer comprises a blend of a first fluoropolymer having a first average molecular weight and a second fluoropolymer having a second average molecular weight. The first average molecular weight is greater than the second average molecular weight.

In a further embodiment, the disclosure is directed to a multilayer polymeric film comprising a first polymer layer and a second polymer layer. The first polymer layer comprises a fluoropolymer having a bimodal molecular weight distribution.

In another embodiment, the disclosure is directed to a multilayer film comprising a polymeric layer including a first fluoropolymer having a first average molecular weight and a second fluoropolymer having a second average molecular weight. The first average molecular weight is greater than the second average molecular weight. The multilayer film is adapted to be drawn at a linespeed of at least about 50 ft/min with a thickness variance no more than about 5%.

In a further embodiment, the disclosure is directed to a method of manufacturing a multilayer film. The method includes extruding a first polymer layer and extruding a second polymer layer. The first polymer layer comprises a blend of a first fluoropolymer having a first average molecular weight and a second fluoropolymer having a second average molecular weight. The first average molecular weight is greater than the second average molecular weight.

Further aspects of the disclosure are found in a multilayer polymeric film comprising a first polymer layer and a second polymer layer. The first polymer layer comprises a fluoropolymer having a bimodal molecular weight distribution of molecules and the first polymer layer has a melt phase tensile strength at least about 50% greater than the melt phase tensile strength of the second layer.

BRIEF DESCRIPTION OF FIGURES

The present disclosure may be better understood, and its numerous objects, features, and advantages made apparent to those skilled in the art by referencing the accompanying drawings.

FIGS. 1, 2 and 3 depict exemplary embodiments of multilayer films.

The use of the same reference symbols in different drawings indicates similar or identical items.

DESCRIPTION OF THE PREFERRED EMBODIMENT(S)

In a particular embodiment, the disclosure is directed to a multilayer film typically including a layer having properties useful for the processing of the multilayer film and a layer having properties that provide mechanical properties in the resulting multilayer film. The multilayer film may further include a layer that provides desirable surface properties. These surface properties may include chemical resistance or adhesiveness. In one exemplary application, the multilayer film may be used in fluoropolymer processing.

Figure 1:
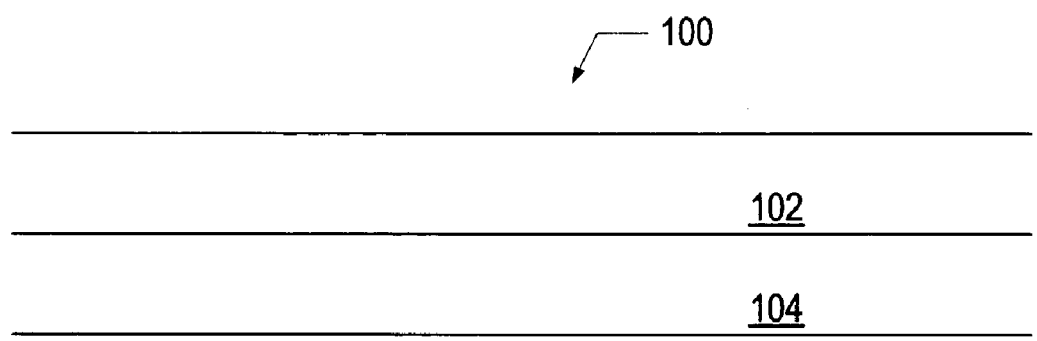

FIG. 1 depicts an exemplary multilayer film. The exemplary film 100 has two layers, 102 and 104. Layer 102 includes a polymer or polymer blend that provides processing characteristics and desired processing behaviors. Layer 104 includes a polymer or polymer blend that provides desired mechanical properties and behaviors exhibited in the resulting multilayer film.

Layer 102 includes a polymer or polymer blend that exhibits desirable processing properties or behaviors in a melt phase. In one exemplary embodiment, the polymer or polymer blend may exhibit melt strain hardening behavior at a given draw ratio or within a given draw ratio domain. In another exemplary embodiment, a polymer or polymer blend may exhibit a higher melt-phase tensile force for a given draw ratio. In one particular embodiment, the polymer of layer 102 may include a melt stain hardening acrylic. In another exemplary embodiment, the polymer or polymer blend may include a polymer having a relatively high molecular weight distribution and exhibiting a relatively high melt-phase tensile force.

Layer 102 may comprise a polymer component exhibiting melt strain hardening at processing conditions. Melt strain hardening is exhibited when the melt-phase tensile force smoothed slope relative to a draw ratio domain is significantly positive for a polymeric component. In one exemplary embodiment, the melt strain hardening component is a non-polyolefin polymer that exhibits melt strain hardening at draw ratios greater than 10:1. In another exemplary embodiment, the melt strain hardening component is a non-polyolefin polymer component exhibiting a melt-phase tensile force smoothed slope in the melt phase of greater than about 0.03 cN between the draw ratios of between 0 and greater than 30:1. For example, the melt-phase tensile force to draw ratio slope may be greater than about 0.04 cN in the draw ratio domain between about 10:1 to about 20:1 or about 10:1 to about 15:1. In another embodiment, the melt strain hardening component may exhibit increasing smoothed melt-phase tensile force in the draw ratio domain between about 5:1 and about 30:1, such as between about 10:1 and about 15:1 or between about 20:1 and about 30:1. In a further exemplary embodiment, the melt strain hardening polymer exhibits melt strain hardening in which the polymer exhibits a positive ratio of change in melt-phase tensile force to change in draw ratio in the draw ratio domain of between a first draw ratio and a second draw ratio, wherein the damage resistant polymer may exhibit a melt plateau in the same domain. According to a particular embodiment, the melt strain hardening polymer exhibits a melt-phase tensile force to draw ratio slope of greater than about 0.03 cN in the desired draw ratio domain. For example, the melt strain-hardening polymer may exhibit a slope of not less than about 0.03 cN over a specific draw ratio domain, such as not less than about 0.4 cN or not less than about 0.5 cN over a specific draw ratio domain. In contrast, a mechanical property or surface property polymer may exhibit a small slope or generally flat slope of less than about 0.03 cN, such as less than about 0.005 cN or substantially zero cN over the specific draw ratio domain. In a further exemplary embodiment, the melt strain hardening polymer exhibits a positive ratio change in melt-phase tensile force to change in draw ratio in the draw ratio domain of about 10:1 and about 15:1 during processing at about 230° C. The damage resistant polymer exhibits a generally flat slope in the same draw ratio domain under the same processing conditions. In a further exemplary embodiment, the melt strain hardening component may exhibit a greater melt-phase tensile force to draw ratio slope than the mechanical or surface components over a draw ratio domain, such as at least about 30%, at least about 50%, at least about 80%, at least about 100%, or at least about 300% greater slope.

The processing property polymer may exhibit a higher melt-phase tensile force than the polymers of the mechanical layer 104 in a given draw ratio domain or at a given draw ratio. For example, an exemplary polymer or polymer blend may exhibit a melt-phase tensile force that is greater than the melt-phase tensile force exhibited by the polymer component of the mechanical layer 104 at a given draw ratio. In one exemplary embodiment, the higher melt-phase tensile force component exhibits a melt-phase tensile force that is at least about 50% greater than that of the mechanical property component in the draw ratio domain of 10:1 to 30:1. For example, a melt-phase tensile force exhibited by the melt properties polymer is at least about 66% higher than the melt-phase tensile force exhibited by the mechanical properties polymer in the range of draw ratios between about 10:1 and 20:1, or between about 10:1 and 15:1. For example, the melt-phase tensile force may be at least about 70% higher, at least about 90% higher, at least about 100% higher, or at least about 133% higher.

The melt strain hardening or higher melt-phase tensile force polymer may, for example, be a non-polyolefin polymer such as acrylic and not polyethylene or polypropylene. In one exemplary embodiment, the non-polyolefin polymer may be a branched polymer. In another exemplary embodiment, the non-polyolefin polymer may be a linear polymer. An acrylic polymer may be formed from a monomer having an alkyl group having from 1-4 carbon atoms, a glycidyl group or a hydroxyalkyl group having from 1-4 carbon atoms. Representative acrylic polymers include polymethyl methacrylate, polyethyl methacrylate, polybutyl methacrylate, polyglycidyl methacrylate, polyhydroxyethyl methacrylate, polymethyl acrylate, polyethyl acrylate, polybutyl acrylate, polyglycidyl acrylate, polyhydroxyethyl acrylate and mixtures thereof.

The acrylic polymer may, for example, be an impact grade or impact modified acrylic. Impact-modified acrylic polymers generally comprise a copolymer of monomers of acrylic monomers with an effective amount of suitable comonomer or graft moiety to produce the desired elastic modulus and impact resistance. An acrylic elastomer, sometimes referred to as acrylate rubber, polyacrylate rubber, polyacrylic elastomer or "ACM" and which is a composition based on a mixture of a polyacrylate and polymethacrylate, a polyacrylate and ethylene methacrylate copolymer ("EMAC") (such as Chevron Chemicals EMAC 2260), or a polyacrylate and ethylene butylacrylate ("EBAC") can be used. Alternatively, a thermoplastic impact-modified acrylic polymer can be a blend of a clear glassy acrylic polymer, such as a plastic copolymer of ethylene and a carboxylic acid compound selected from acrylic acid, methacrylic acid and mixtures thereof, with elastomeric components, for example.

In one embodiment, the impact-modified acrylic polymer generally includes fine particles of the elastomer dispersed uniformly in the plastic copolymer. The impact grade acrylic may comprise transparent toughened thermoplastic blends prepared by blending 10 to 99 weight percent of a block copolymer; 0.1 to 1 weight percent of particulate rubber having a particle size from 0.1 to 10 microns; and the balance a clear glassy polymer. Another suitable technique for making impact-modified acrylic polymer employs the use of a so-called "core/shell" product, such as Atofina DR-101 resin. These generally are polymer particles that have a central core of one polymer surrounded by a shell of another polymer. The core can be either the plastic or elastomer component and the shell will be the opposite, i.e., elastomer or plastic component. The core/shell particles are fed to a melt mixing apparatus, such as a melt extruder in which the core and shell domains are blended in the melt phase to form a homogeneous blend on a much smaller scale and a film is formed from the extrudate of this homogeneous blend.

In one particular embodiment, the melt strain hardening material may be a linear impact modified acrylic. In a further exemplary embodiment, the melt strain hardening acrylic may be a branched impact modified acrylic. Generally, linear acrylic polymers that are not impact modified, such as those used in adhesive layers, are not suitable. However, an acrylic exemplifying melt strain hardening behavior in the desired draw ratio domain is suitable. In another exemplary embodiment, an acrylic exemplifying higher melt-phase tensile force in the desired draw ratio domain may be suitable.

In further exemplary embodiments, the layer 102 comprises a blend of melt strain hardening polymer and other components. For example, the layer 102 may comprise at least about 70% by weight of the melt strain hardening component, such as, impact grade acrylic. In an exemplary embodiment, the layer may comprise at least about 75%, at least about 80%, at least about 85%, or at least about 90% impact grade acrylic. Layer 102 may also include other components such as the damage resistant polymer. For example, the layer 102 may include no more than about 30% PVDF, PVDF copolymer or blend thereof by weight when the melt strain hardening component includes acrylic. In other exemplary embodiments layer 102 may include no more than about 25%, no more than about 20%, no more than about 15%, or no more than about 10% PVDF by weight. In one embodiment, layer 104 consists essentially of the melt-strain hardening component.

In another exemplary embodiment, the melt strain hardening components or higher melt-phase tensile force component may include a higher average molecular weight polymer. For example, in fluoropolymer applications, layer 102 may include a blend of fluoropolymers that includes a low to medium average molecular weight fluoropolymer and a high average molecular weight fluoropolymer that exhibits melt strain hardening and higher melt-phase tensile force at a given draw ratio. In one particular embodiment, the lower average molecular weight polymer may include PVDF having a weight average molecular weight not greater than about 200 kg/mol, such as not greater than about 190 kg/mol or not greater than about 180 kg/mole. The higher average molecular weight polymer may include PVDF having a molecular weight at least about 200 kg/mole, such as at least about 250 kg/mole, at least about 285 kg/mole, or at least about 365 kg/mole. In alternative embodiments, the average molecular weight may be determined using number average molecular weight and z-average molecular weight methods. The higher average molecular weight polymer may have a molecular weight distribution that peaks at a molecular weight at least about 25% higher than the peak of the molecular weight distribution of the lower average molecular weight polymer. For example, the higher average molecular weight polymer distribution peak may be at least about 50%, at least about 60%, at least about 80% or at least about 90% higher than the peak of the lower average molecular weight polymer distribution. In an exemplary embodiment in which the fluoropolymers are derived from the same monomer, the resulting blend produces a bimodal molecular weight distribution of polymer molecules.

Exemplary fluoropolymers include fluorine substituted olefin polymers and polymers comprising at least one monomer selected from the group consisting of vinylidene fluoride, vinylfluoride, tetrafluoroethylene, hexafluoropropylene, trifluoroethylene, chlorotrifluoroethylele, ethylenechlorotrifluoroethylene, and mixtures of such fluoropolymers. The fluoropolymer polymers include polyvinylidene fluoride (PVDF) and PVDF copolymers, such as vinylidene fluoride/hexafluoropropylene copolymer. Many fluoropolymers are commercially available from suppliers in various grades. For example suppliers can supply multiple resins having nominally the same composition but different properties, such as different molecular weights to provide specific viscosity characteristics. Exemplary PVDF polymers include PVDF 1010 and PVDF 21510 by Solvay Solexis. Other examples include Kynar 720, Kynar 740, and Kynar 760 by Atofina. Kynar 760 has a higher average molecular weight than Kynar 720 and Kynar 740. It is contemplated that the polymer component of the layer 102 may include a melt blend of multiple fluoropolymers in place of one such polymer. Alloys of PVDF homopolymer and PVDF copolymer may provide the film with improved elastic modulus and gloss reduction. In one exemplary embodiment, the polymer may consist essentially of fluorinated polymer.

In one particular embodiment, layer 102 includes a blend of the higher average molecular weight polymer and the low or moderate average molecular weight polymer. In a particular embodiment, the blend includes at least about 60% by weight of the high average molecular weight polymer. For example, the blend may include at least about 70%, at least about 75%, at least about 80%, at least about 85%, at least about 90%, or as high as 100% by weight of the high average molecular weight polymer. In another exemplary embodiment, the polymer blend may include not more than about 40% by weight of the low or moderate average molecular weight polymers. For example, the polymer blend may include not more than about 30%, not more than about 25%, not more than about 20%, not more than about 15% or not more than about 10% of the low or moderate average molecular weight polymer. In one particular embodiment, the high average molecular weight polymer is Kynar 760, the moderate average molecular weight polymer is Kynar 740, and the low average molecular weight polymer is Kynar 720.

In addition, layer 102 may include inorganic fillers, organic fillers, antioxidants, UV additives, flame retardants, antidegradation additives, and adjuvants, among others. For example, layer 102 may include minor but significant fractions of antidegradation additives and adjuvants. The inorganic filler may, for example, include titanium dioxide, zinc oxide, iron oxide, calcium carbonate, carbon black, color pigments and clays.

Layer 104 may include polymers or polymer blends that provide desired mechanical properties and behaviors in the resulting multilayer film. Such mechanical properties may include elongation, flexibility and drape. These properties may, for example, be similar to the properties of fluoropolymer film. In one exemplary embodiment, layer 104 comprises the damage resistant component in a blend of other components, such as a fluorinated polymer. In particular embodiment, layer 104 comprises greater than about 3% by weight of a fluorinated polymer, such as those fluorinated polymers listed above, for example, PVDF, such as Atofina PVDF 1010. Layer 104 may also include additional polymers, such as acrylics, such as either impact modified or non-impact modified acrylics. In one exemplary embodiment, layer 104 includes the melt strain-hardening component such as impact grade acrylic or the higher average molecular weight polymer in amounts no more than about 40% by weight of the layer, such as no more than about 30%, no more than about 25%, no more than about 20%, or no more than about 15% by weight. In addition, layer 104 may include inorganic fillers, organic fillers, antioxidants, UV additives, flame retardants, antidegradation additives, and adjuvants, among others. For example, layer 104 may include minor but significant fractions of antidegradation additives and adjuvants. The inorganic filler may, for example, include titanium dioxide, zinc oxide, iron oxide, calcium carbonate, carbon black, color pigments and clays. In one exemplary embodiment, layer 104 comprises greater than about 40% by weight PVDF, no more than about 50% impact grade acrylic, an inorganic filler, and antidegradation additive. For example, layer 104 comprises at least about 50%, at least about 60%, at least about 70%, or at least about 80% by weight PVDF.

In one exemplary embodiment, layer 102 comprises no more that about 40% by volume of the multilayer film. For example, layer 102 may comprise not more than about 30% by volume, not more about 25% by volume, not more about 20% by volume, not more about 15% by volume, not more about 10% by volume, not more about 5% by volume or less of the multilayer film. In another exemplary embodiment, layer 104 may comprise at least about 40% by volume of the multilayer film. For example, layer 104 may comprise at least about 60% by volume, at least about 70% by volume, at least about 75% by volume, at least about 80% by volume, or at least about 90% by volume of the multilayer film.

The multilayer film 100, may be formed with two or more layers. For example, the multilayer film 100 may be a three layer, four layer, or five layer film. In an alternate embodiment, a polymer may be selected such that a lower molecular weight polymer provides the mechanical properties and a higher molecular weight polymer provides the melt phase processing properties. In this particular embodiment, the bimodal molecular weight distribution of molecules formed from a common monomer provide for the processing properties and the mechanical properties. In this particular case, a single layer film may be formed that includes a polymer with a bimodal molecular weight distribution.

Figure 2:
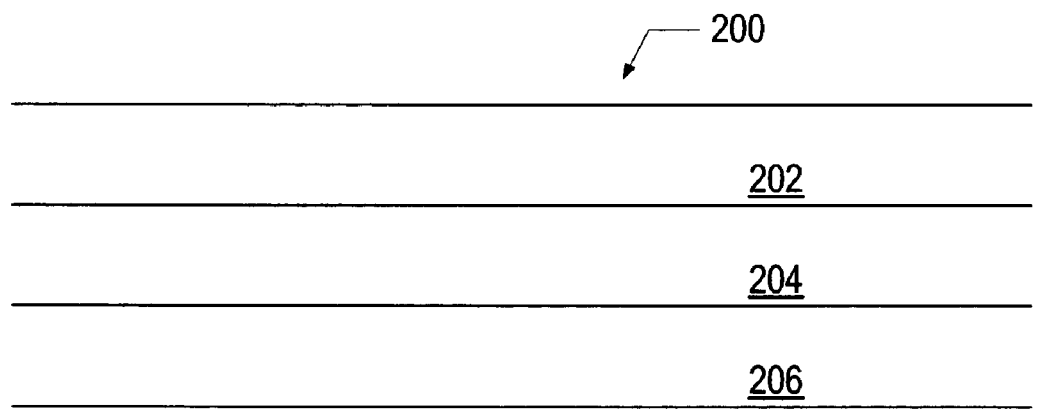

FIG. 2 depicts an alternative embodiment including a three layer film 200. Layer 202 may provide surface properties to the multilayer film. Layer 204 may provide processing properties and behaviors in the melt phase and layer 206 may provide mechanical properties and behaviors in the resulting multilayer film.

Layer 202 may include polymers or polymer blends that exhibit desired surface behaviors. For example, layer 202 may be formed of a chemical resistive polymer such as a fluoropolymer. In an alternate embodiment, layer 202 may be formed of an adhesive polymer such as an acrylic. Layer 204 may provide the desired processing properties and behaviors in the melt phase and may include polymers or polymer blends that exhibit the desired processing behaviors. For example, layer 204 may include melt strain hardening polymers or higher melt-phase tensile force polymers that exhibit desired processing behaviors within specified draw ratio domains or at specific draw ratios. In one exemplary embodiment, layer 204 may include acrylic or acrylic blends. In another exemplary embodiment, layer 204 may include a high average molecular weight polymer or a bimodal molecular weight distribution of molecules formed from a common monomer. Layer 206 may include a polymer or polymer blend that exhibits desired mechanical properties or behaviors in a resulting multilayer film. In one exemplary embodiment, layer 206 includes a fluoropolymer/acrylic blend. In an alternate embodiment, layer 204 and layer 206 may be interchanged.

In an exemplary embodiment, layer 202 may form not more that about 30% by volume of the multilayer film. For example, layer 202 may comprise not more than about 20% by volume, not more than about 10% by volume, or not more than about 5% by volume of the multilayer film. In an embodiment, layer 204 may comprise not more than about 30% by volume of the multilayer film. For example, layer 204 may comprise not more than about 20% by volume, not more than about 10% by volume, or not more than about 5% by volume of the multilayer film. In a further exemplary embodiment, layer 206 may comprise at least about 40% by volume of the multilayer films. For example, layer 206 may comprise at least about 60% by volume, at least about 80% by volume, or at least about 90% by volume of the multilayer film.

Figure 3:
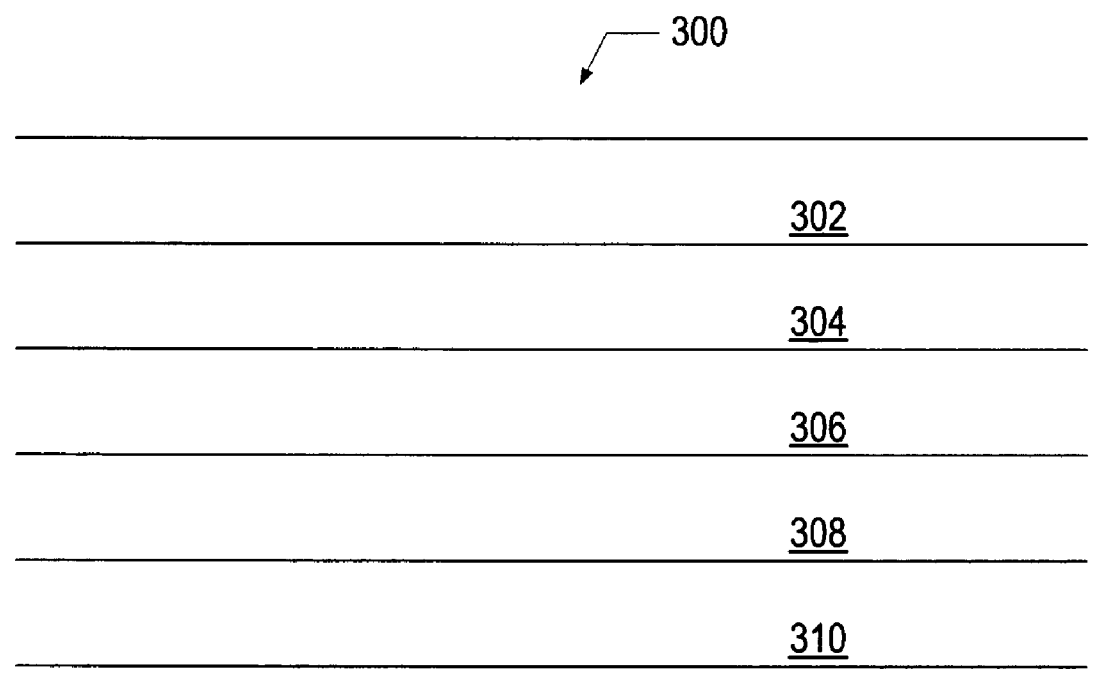

FIG. 3 depicts a further exemplary embodiment of a multilayer film. In this exemplary embodiment, the multilayer film 300 includes at least five layers. Layers 302 and 310 may provide surface qualities to the multilayer film. For example, layers 302 and 310 may include a chemically resistive polymer, such as a fluoropolymer. In an alternate embodiment, layers 302 and 310 may include an adhesive, such as an acrylic. In a further embodiment, layer 302 and 310 may exhibit differing behaviors. For example, layer 302 may exhibit chemical resistance and layer 310 may exhibit adhesive behaviors.

In one exemplary embodiment, layers 304 and 308 may exhibit desired processing properties and behaviors in the melt phase. For example, layers 304 and 308 may include polymers that exhibit melt strain hardening and/or higher melt-phase tensile force in a given draw ratio domain. For example, layers 304 and 308 may include a melt strain hardening acrylic or a blend of polymers that includes a high average molecular weight polymer or exhibits higher melt-phase tensile force.

Layer 306 may, for example, include polymers or polymer blends that exhibit desired mechanical properties or behaviors in a resulting multilayer film. For example, layer 306 may include a fluoropolymer or a blend of fluoropolymer and acrylic. In an alternate embodiment, the layer 306 may be divided and distributed as layers 304 and 308, and layers 304 and 308 may be combined as layer 306.

In one embodiment, layers 302 and 310 formed of a damage resistant polymer component, together comprise not more than about 30% by volume of the multilayer film. For example, each layer 302 and 310 may comprise not more than about 10% by volume, or not more than about 5% by volume of the multilayer film. Layers 304 and 308 formed of the melt strain hardening component or higher melt-phase tensile force component, together may comprise not more than about 40% by volume of the multilayer film. For example, layers 304 and 308 may form not more than about 10% by volume each, or not more than 5% by volume each of the multilayer film. Layer 306, formed of a component having desirable mechanical properties, may comprise at least about 40% by volume of the multilayer film. For example, layer 306 may form at least about 60% of the multilayer film, or even at least about 80% of the multilayer film. In an alternate example, in which layer 306 is split into multiple layers, the combined layers provide at least about 40% by volume of the multilayer film.

In one exemplary embodiment, the film structure may be A/C/B/C/A where each letter represents a different material extruded from a unique extruder. Layer A may, for example, be a 100% Solvay Solexis PVDF 1010 and may form about 10% by volume of the multilayer film. Layer B may be a PVDF/acrylic blend comprising at least about 60% by weight PVDF homopolymer and/or copolymer and not more than about 40% acrylic by weight. Layer B may form approximately 40% by volume of the multilayer film. Layers C may be formed of Atofina impact grade acrylic DR101, each of the C layers making up about 5% by volume of the multilayer film. Alternately, the C layers may be formed of a blend of a higher average molecular weight, high melt-phase tensile force component and a lower average molecular weight component, such as a blend of PVDF polymers.

In another exemplary embodiment, the film structure may be A/C/B/C/D where each letter represents a different material extruded from a unique extruder. Layer A may, for example, be a 100% PVDF 1010 and may form about 10% by volume of the multilayer film. Layer B may be a PVDF/acrylic blend comprising greater than about 60% by weight PVDF and not more than about 40% acrylic by weight. Layer B may form approximately 40% by volume of the multilayer film. Layers C may be formed of Atofina impact grade acrylic DR101, each of the C layers making up about 5% by volume of the multilayer film. Alternately, the C layers may be formed of a blend of a higher average molecular weight, high melt-phase tensile force component and a lower average molecular weight component, such as a blend of PVDF polymers. Layer D may form approximately 30% by volume of the multilayer film. Layer D may comprise similar materials to Layer B. However, Layer D may be enhanced for custom properties, such as having a lower melting temperature (e.g. more acrylic) for heat sealing. Layer B may also be used exclusively for the addition of recycle and trim.

In another exemplary embodiment, the film structure may be A/C/B/C/B. Layer A may be a 100% PVDF 1010 and may comprise about 10% by volume of the multilayer film. Layers B may comprise a PVDF/acrylic blend comprising greater than about 55% PVDF and no more than about 45% acrylic by weight. The B layers may, in combination, comprise about 70% by volume of the multilayer film. In one exemplary embodiment, the outside B layer may comprise between about 20% to 35% of the total film volume. The C layers may be an Atofina impact grade acrylic DR101. Alternately, the C layers may be formed of a blend of a high average molecular weight, high melt-phase tensile force component and a lower average molecular weight component, such as a blend of PVDF polymers. Each of the C layers may comprise about 5% by volume of the total film volume.

In a further exemplary embodiment, the film structure may be A/B/C wherein layer A is 100% Solvay Solexis PVDF 1010 or Atofina Kynar 740, comprising about 5-10% by volume of the film. Layer B is a PVDF and acrylic blend comprising about 30-80 wt % PVDF, such as about 60 wt % PVDF, and about 40 wt % acrylic. Layer B comprises about 80-90% by volume of the film. Layer C is a PVDF and acrylic blend comprising about 55-100 wt % acrylic, such as about 60-70 wt % acrylic and about 30-40 wt % PVDF. Layer C comprises about 5-10% by volume of the film.

Another exemplary structure may be an A/B or an A/B/A structure. For example, layer A may include a melt strain hardening polymer and fluorinated polymer, such as a PVDF/acrylic blend having 70% impact modified or melt strain hardening acrylic, and layer B may include a polymer blend of PVDF and acrylic polymers including at least about 70% PVDF. In another example, layer A includes a non-melt strain hardening fluoropolymer and layer B includes a blend of PVDF and acrylic including at least about 70% melt strain hardening polymer or bimodal molecular weight fluoropolymer.

Another exemplary structure may be C/B/C in which layer C is a PVDF and acrylic blend comprising about 55-100 wt % acrylic, such as about 60-70% acrylic and about 30-40 wt % PVDF. Layer B is a PVDF and acrylic blend comprising about 30-80 wt % PVDF, such as about 60 wt % PVDF and about 40 wt % acrylic. Layer C comprises about 5-10% by volume and layer B comprises about 80-90% by volume of the film.

A further exemplary embodiment includes at least 3 layers extruded via 3 extruders. A first layer includes a fluoropolymer. A second layer includes a melt strain hardening component and a third layer is an adhesive layer comprising greater than about 55 wt % acrylic, such as greater than about 70 wt % acrylic.

Another exemplary embodiment includes at least 4 layers, such as 5 layers. Layer 1 includes a fluoropolymer. Layer 2 includes a melt strain hardening component or higher melt-phase tensile force component. Layer 3 includes between about 20 wt % and 80 wt % acrylic and between about 20 wt % and 80 wt % fluoropolymer. An optional layer 4 includes the melt strain hardening component or higher melt-phase tensile force component. Layer 5 is an adhesive layer. The 5-layer structure may be formed using 4 extruders.

An alternate exemplary embodiment includes at least 4 layers, such as 5 layers. Layer 1 is an adhesive layer. Layer 2 includes a melt strain hardening component or higher melt-phase tensile force component. Layer 3 includes between about 20 wt % and 80 wt % acrylic and between about 20 wt % and 80 wt % fluoropolymer. An optional layer 4 includes the melt strain hardening component or higher melt-phase tensile force component. Layer 5 is an adhesive layer. The 5-layer structure may be formed using 4 extruders.

In a further exemplary embodiment, a film includes a fluoropolymer blend having a bimodal molecular weight distribution of molecules derived from a common monomer. For example, the common monomer may be a fluorinated monomer, such as PVDF. The blend may be formed through mixing polymers having different average molecular weights.

In another exemplary embodiment, a multilayer film may include a layer structure A/B/C/B/A. Layer A may be a surface properties layer, such as a PVDF layer or an acrylic layer. Layer B may include a polymer or polymer blend having a bimodal molecular weight distribution of molecules formed from a common monomer or a blend of two polymers, such as fluoropolymers having differing average molecular weight. Layer C may be formed with a PVDF/acrylic blend. Layers A may comprise no more than about 10% of the multilayer film each or no more than about 20% of the multilayer film in combination. Layers B may form no more than about 10% by volume of the multilayer film individually or in combination no more than about 20% by volume of the multilayer film. Layer C may comprise at least about 60% by volume of the multilayer film. In an alternate embodiment, layers B may be combined to form layer C and layer C may be divided to replace layers B.

In a further exemplary embodiment, a two-layer film may include a first layer having a blend of high average molecular weight polymer and a low or moderate average molecular weight polymer. The blend may include greater than 60% by weight of the high average molecular weight polymer. In one particular embodiment, a 30/70 blend by weight of Kynar 720 and Kynar 760, respectively, may be used. The first layer may comprise no more than about 20% by volume of the multilayer film. The second layer may be formed of a fluoropolymer or fluoropolymer/acrylic blend and comprise at least about 80% by volume of the multilayer film.

Such multilayer films may be manufactured by co-extruding the foregoing embodiments. In particular embodiments, the co-extruded film may be drawn at linespeeds of at least about 50 ft/min, such as at least about 60 ft/min or at least about 100 ft/min. The resulting multilayer film has a thickness variance of not more than about 5%, such as not more than about 4%, not more than about 3%, not more than about 2%, or not more than about 1%, and is substantially free of draw resonance. For example, the thickness may statistically vary from the average thickness by not more than about 5% of the average thickness.

Melt-phase tensile force may be measured using a Geottfert Rheo-Tens apparatus. In one example, the parameters of the Geortfert Rheo-Tens apparatus include a wheel position approximately 110 mm below the die, piston speed of 0.06 mm/s, ambient wheel temperature, 12 mm barrel diameter, 180° die entry angle, 1 mm die inner diameter, 20 mm die length, 6 min dwell time, and a barrel temperature of 230° C. The take off unit may have a wheel gap of approximately 4 mm.

Figure 4:
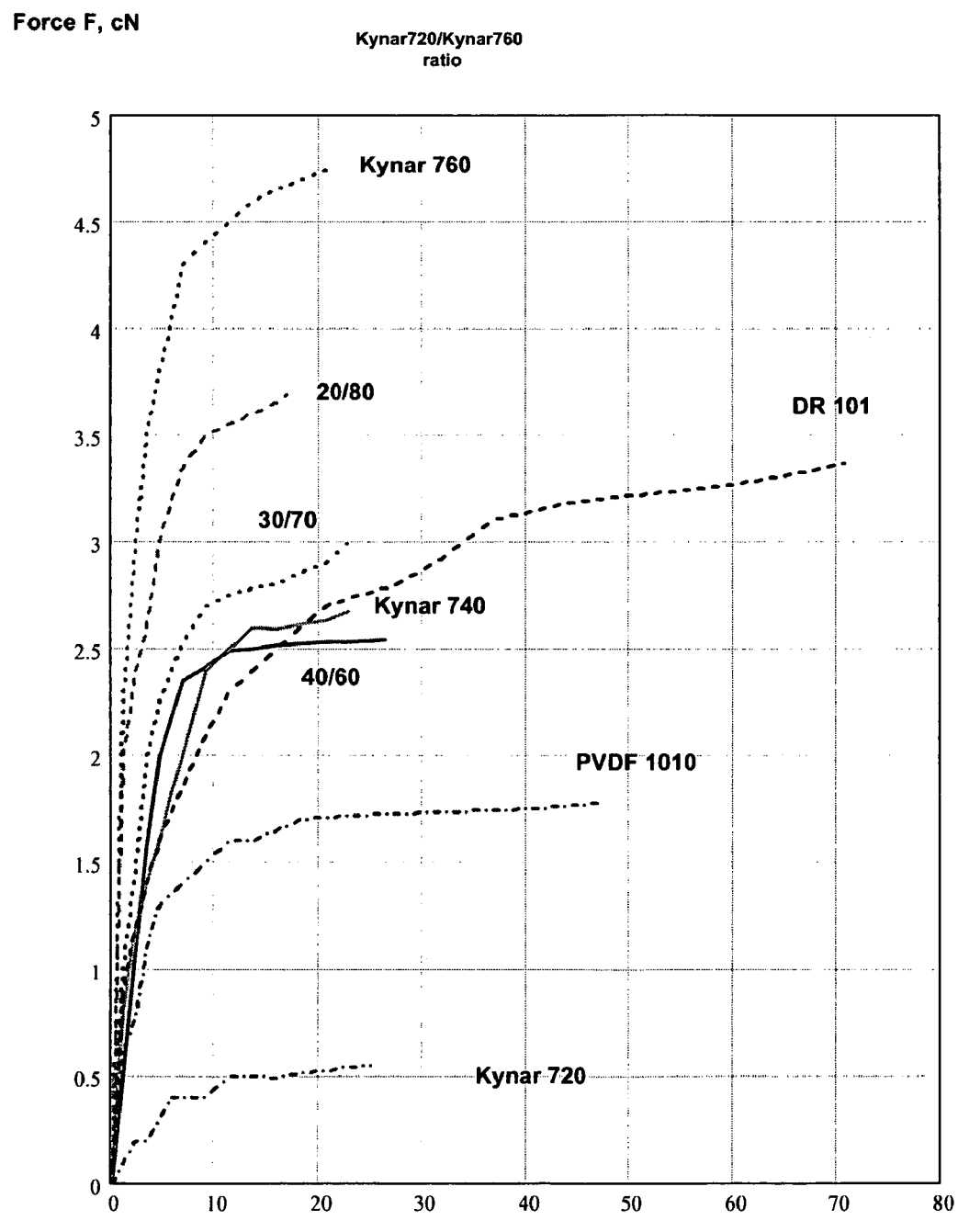
FIG. 4 depicts extensional velocity data for exemplary film components.

FIG. 4 depicts the melt-phase tensile force of exemplary polymers and polymer blends over a draw ratio domain. An impact modified acrylic by Atofina (DR101) exhibits melt strain hardening in a desired range between draw ratios 10:1 and 20:1. Similarly, a high molecular weight PVDF such as Kynar 760 by Atofina exhibits melt strain hardening in the same draw ratio domain. Both of these polymers exhibit higher melt-phase tensile force than a PVDF polymer by Solvay Solexis (PVDF 1010). In addition, the graph shown in FIG. 4 depicts the melt-phase tensile force behavior of blends of the higher molecular weight Atofina Kynar 760 with a lower molecular weight Atofina Kynar 720. The blend results in a polymer blend having a bimodal molecular weight distribution of molecules formed from a common monomer such as, in this case, PVDF. Blends are depicted having ratios by weight of Kynar 720 and Kynar 760. As the quantity of Kynar 760 decreases. The exhibited melt-phase tensile force in the given draw ratio domain decreases. For example, a 20/80 blend of Kynar 720 and Kynar 760, respectively, exhibits a higher melt-phase tensile force than the 30/70 blend and the 30/70 blend exhibits a higher melt-phase tensile force than a 40/60 blend. Medium average molecular weight PVDF, Kynar 740, and lower molecular weight PVDF Kynar 720, are shown on the graph for comparison. A mechanical properties layer in the resulting film may, for example, be formed using the Solvay Solexis PVDF 1010 or a blend of the Solvay Solexis PVDF 1010 with acrylics, including linear non-impact modified acrylics. A processing layer may be formed utilizing the Atofina DR101 impact modified acrylic, a blend of the Atofina impact modified acrylic DR101 and PVDF such as a PVDF 1010 or the Kynar PVDF 720, or a blend of the Kynar 720 and Kynar 760 such as, for example, a 20/80 blend or a 30/70 blend.

The above disclosed subject matter is to be considered illustrative, and not restrictive, and the appended claims are intended to cover all such modifications, enhancements, and other embodiments, which fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A multilayer film comprising:
    a first polymer layer forming an outer surface of the multilayer film and comprising 100% by weight fluoropolymer;
    a second polymer layer comprising a blend of a first fluoropolymer having a first average molecular weight and a second fluoropolymer having a second average molecular weight, the first average molecular weight being at least about 25% greater than the second average molecular weight; and
    a third polymer layer comprising greater than about 40% by weight fluoropolymer at not greater than about 40% by weight acrylic polymer.

2. The multilayer film of claim 1, wherein the first fluoropolymer and the second fluoropolymer are derived from a common monomer.

3. The multilayer film of claim 1, wherein the first fluoropolymer exhibits melt-phase tensile force that is at least about 50% greater than melt-phase tensile force exhibited by the second fluoropolymer in the melt phase at a draw ratio.

4. The multilayer film of claim 3, wherein the draw ratio is between about 10:1 and about 30:1.

5. The multilayer film of claim 3, wherein the draw ratio is between about 10:1 and about 15:1.

6. The multilayer film of claim 1, wherein the second polymer layer comprises no more than about 30% by volume of the multilayer film.

7. The multilayer film of claim 1, wherein the first fluoropolymer comprises at least about 60% by weight of the second polymer layer.

8. The multilayer film of claim 1, wherein the second fluoropolymer comprises no more than about 40% by weight of the second polymer layer.

9. The multilayer film of claim 1, wherein the first fluoropolymer comprises PVDF.

10. The multilayer film of claim 1, wherein the second fluoropolymer comprises PVDF.

11. The multilayer film of claim 1, wherein the third polymer layer comprises PVDF.

12. The multilayer film of claim 1, wherein the fluoropolymer of the first and third polymer layers comprises PVDF.

13. The multilayer film of claim 1, wherein the multilayer film is adapted to be drawn at a linespeed of at least about 50 ft/min.

14. The multilayer film of claim 13, wherein the film thickness of the multilayer film varies no more than about 5%.

15. The multilayer film of claim 1, wherein the first average molecular weight is at least about 50% greater than the second average molecular weight.

16. The multilayer film of claim 15, wherein the first average molecular weight is at least about 60% greater than the second average molecular weight.

17. The multilayer film of claim 1, further comprising a fourth polymer layer comprising the blend of the first fluoropolymer and the second fluoropolymer.

18. The multilayer film of claim 17, further comprising a fifth polymer layer forming a second outer surface of the multilayer film.

19. The multilayer film of claim 18, wherein the fifth polymer layer comprises an acrylic.

20. The multilayer film of claim 18, wherein the fifth polymer layer comprises fluoropolymer.

21. The multilayer film of claim 20, wherein the fifth polymer layer consists of fluoropolymer.

22. A multilayer polymeric film comprising:
    a first polymer layer comprising a first fluoropolymer having a bimodal molecular weight distribution, wherein a higher molecular weight peak in the bimodal molecular weight distribution is located at a molecular weight at least about 25% greater than the molecular weight at which a lower molecular weight peak of the bimodal molecular weight distribution is located;
    a second polymer layer forming an interior layer of the multilayer polymeric film and comprising greater than about 40% by weight of a second fluoropolymer and not greater than 40% by weight acrylic; and
    a third polymer layer forming an exterior surface of the multilayer polymer film consisting of the second fluoropolymer.

23. The multilayer film of claim 22, wherein the first polymer layer has a melt-phase tensile strength at least about 50% greater than the melt-phase tensile strength of the second layer at the same draw ratio.

24. The multilayer film of claim 23, wherein the draw ratio is between about 10:1 and about 30:1.

25. The multilayer film of claim 23, wherein the draw ratio is between about 10:1 and about 15:1.

26. The multilayer film of claim 22, wherein the first fluoropolymer comprises PVDF.

27. The multilayer film of claim 22, wherein the second polymer layer comprises at least about 40% by volume of the multilayer film.

28. The multilayer film of claim 22, wherein the higher molecular weight peak in the bimodal molecular weight distribution is located at a molecular weight at least about 50% greater than the molecular weight at which the lower molecular weight peak of the bimodal molecular weight distribution is located.

29. The multilayer film of claim 22, wherein the second polymer layer comprises at least about 60% fluoropolymer.

30. The multilayer film of claim 29, wherein the second polymer layer comprises acrylic.

31. The multilayer film of claim 22, wherein the multilayer film is adapted to be drawn at a linespeed of at least about 50 ft/min.

32. The multilayer film of claim 31, wherein the film thickness of the multilayer film varies no more than about 5%.

33. The multilayer film of claim 22, further comprising a fourth layer comprising the first fluoropolymer.

34. The multilayer film of claim 33, further comprising a fifth layer forming an exterior surface of the multilayer film.

35. The multilayer film of claim 34, wherein the fifth layer comprises acrylic polymer.

36. The multilayer film of claim 34, wherein the fifth layer comprises the second fluoropolymer.

37. A multilayer film comprising;
a first polymeric layer forming a first exterior surface;
a second polymeric layer underlying the first polymeric layer and comprising a first fluoropolymer having a first average molecular weight and a second fluoropolymer having a second average molecular weight, the first average molecular weight being at least about 25% greater than the second average molecular weight;
a third polymeric layer in direct contact with a major surface of the second polymeric layer, the third polymeric layer comprising greater than about 40% by weight fluoropolymer and not greater than about 40% by weight acrylic polymer;
a fourth polymeric layer in direct contact with a major surface of the third polymeric layer, fourth polymeric layer comprising the first and second fluoropolymers; and
a fifth polymeric layer forming a second exterior surface of the multilayer film;
wherein the multilayer film is drawn at a linespeed of at least about 50 ft/min and the thickness of the multilayer film has a variance of no more than about 5%.

38. The multilayer film of claim 37, wherein the variance is no more than about 3%.

39. The multilayer film of claim 37, wherein the first fluoropolymer and the second fluoropolymer are derived from a common monomer.

40. The multilayer film of claim 37, wherein the first fluoropolymer is PVDF.

41. The multilayer film of claim 37, wherein the second polymeric layer and the fourth polymeric layer comprise no more than about 30% by volume of the multilayer film.

42. The multilayer film of claim 37, wherein the first average molecular weight is at least about 50% greater than the second average molecular weight.

43. The multilayer film of claim 37, wherein the second polymeric layer has a melt-phase tensile strength at least about 50% greater than the melt-phase tensile strength of the third polymeric layer at the same draw ratio.

* * * * *

UNITED STATES PATENT AND TRADEMARK OFFICE
CERTIFICATE OF CORRECTION

PATENT NO. : 7,297,391 B2 Page 1 of 1
APPLICATION NO. : 10/901456
DATED : November 20, 2007
INVENTOR(S) : Hetzler et al.

It is certified that error appears in the above-identified patent and that said Letters Patent is hereby corrected as shown below:

In Column 11, Claim 1, line 50, please delete "and comprising 100% by weight" and insert therefor --consisting of--.

Signed and Sealed this

Twenty-ninth Day of September, 2009

David J. Kappos
*Director of the United States Patent and Trademark Office*